US006444978B1

(12) United States Patent
Mukaibatake

(10) Patent No.: US 6,444,978 B1
(45) Date of Patent: Sep. 3, 2002

(54) MASS SPECTROMETER HAVING LENS UNIT SUPPORTED WITH SPRINGS

(75) Inventor: Kazuo Mukaibatake, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 95 days.

(21) Appl. No.: 09/590,728

(22) Filed: Jun. 8, 2000

(30) Foreign Application Priority Data

Sep. 17, 1999 (JP) .......................................... 11-263402

(51) Int. Cl.[7] .......................... B01D 59/44; H01J 49/00; G01K 5/08; G01K 5/10; G21K 5/10

(52) U.S. Cl. .............. 250/281; 250/441.11; 250/442.11

(58) Field of Search ................................ 250/281, 398, 250/292, 396 R, 299, 441.11, 442.11

(56) References Cited

U.S. PATENT DOCUMENTS 3,745,343 A * 7/1973 Halliday et al. .... 250/41.9 ME

* cited by examiner

*Primary Examiner*—John R. Lee
*Assistant Examiner*—David A. Vanore
(74) *Attorney, Agent, or Firm*—Beyer Weaver & Thomas LLP

(57) ABSTRACT

A mass spectrometer is structured such that a lens unit is firmly kept at a fixed position inside a main body by providing springs and hooking their top ends by hooks while their bottom ends are affixed to the main body such that the elastic force of the deformed springs presses the lens unit against one of inner walls of the main body.

6 Claims, 3 Drawing Sheets

MASS SPECTROMETER HAVING LENS UNIT SUPPORTED WITH SPRINGS

BACKGROUND OF THE INVENTION

This invention relates to a mass spectrometer.

In general, a mass spectrometer includes an ionization part where a sample is ionized and an ion flow is generated, a beam converging part where the ions in this flow are converged and accelerated by means of a lens system comprising a plurality of plate electrodes or the like to generate an ion beam, and a detection part where the ions in this ion beam are separated according to the mass number (of the ratio between the mass m and the charge z) and the separated ions are analyzed.

Mass spectrometers of a so-called differential air discharge type are known as examples of mass spectrometers using an ionization method whereby a sample is ionized under an atmospheric condition (such as the atmospheric pressure ionization method). A mass spectrometer of the differential air discharge type is characterized as having its ionization part, beam converging part and detection part mutually separated by differential walls which need not necessarily be planar but are each provided with a passage, or a hole, with an extremely small diameter for allowing ions to pass therethrough. The beam converging part and the detection part are each provided with a pump for air discharge. During an analysis, the interior of the ionization part is maintained at an atmospheric pressure but these pumps are appropriately operated to such that the interior of the beam converging part is kept in a medium vacuum condition, say, at pressure about $10^{-2}$ Pa and that of the detection part is kept in a high vacuum condition, say, at pressure about $10^{-4}$ Pa.

Because a mass spectrometer of the differential air discharge type is of a relatively complicated structure with its interior separated by a plurality of partition walls, the maintenance work on its various internal components is generally cumbersome, and this problem is particularly significant regarding the beam converging part because the beam converging part according to the prior art technology is sandwiched between the ionization part and the detection part, being blocked thereby both from the front and from the back. According to the prior art technology, furthermore, an opening for the maintenance work through which the beam converging part can be accessed is provided on the front side of the spectrometer. Thus, components in the ionization part must be removed first in order to clear the access route for the beam converging part before components of the beam converging part can be accessed for their maintenance work.

Moreover, the beam converging part contains a large number of components such as the plate electrodes for the convergence and acceleration of the ion flow. In order to check all of these components, the operator must be able to make an access from all directions. As long as the beam converging part is inside the main body of the mass spectrometer, however, it is difficult to access these components from different directions. In reality, components of the beam converging part must be taken out of the main body of the spectrometer. Since no attempt has even been made to simplify the access to these components, it has been necessary to remove screws and bolts by using a screwdriver or the like as a cumbersome work process. It now goes without saying that the same processes must be repeated after the maintenance work has been completed in order to set the processed components back where they were. It also goes without saying that the same problem has existed with mass spectrometers of other types structured such that components for the beam convergence cannot be accessed from different directions.

SUMMARY OF THE INVENTION

It is therefore an object of this invention to provide a mass spectrometer structured such that components of its beam converging part such as a lens system can be easily maintained.

A mass spectrometer embodying this invention, with which the above and other objects can be accomplished, may be characterized not only comprising a lens system for generating an ion beam by converging and accelerating an ion flow obtained by ionizing a sample and an airtight main body which seals in this lens system but also wherein the lens system includes a lens unit having many components and there are also provided a positioning unit for properly positioning this lens unit inside the main body, elastic members contained inside the main body and holders for maintaining these elastic members in a deformed condition such that the lens unit is not only positioned by this positioning unit but also kept at this position by the elastic force of the elastic members supported by their holders.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings.

DETAILED DESCRIPTION OF THE INVENTION

Figure 1:
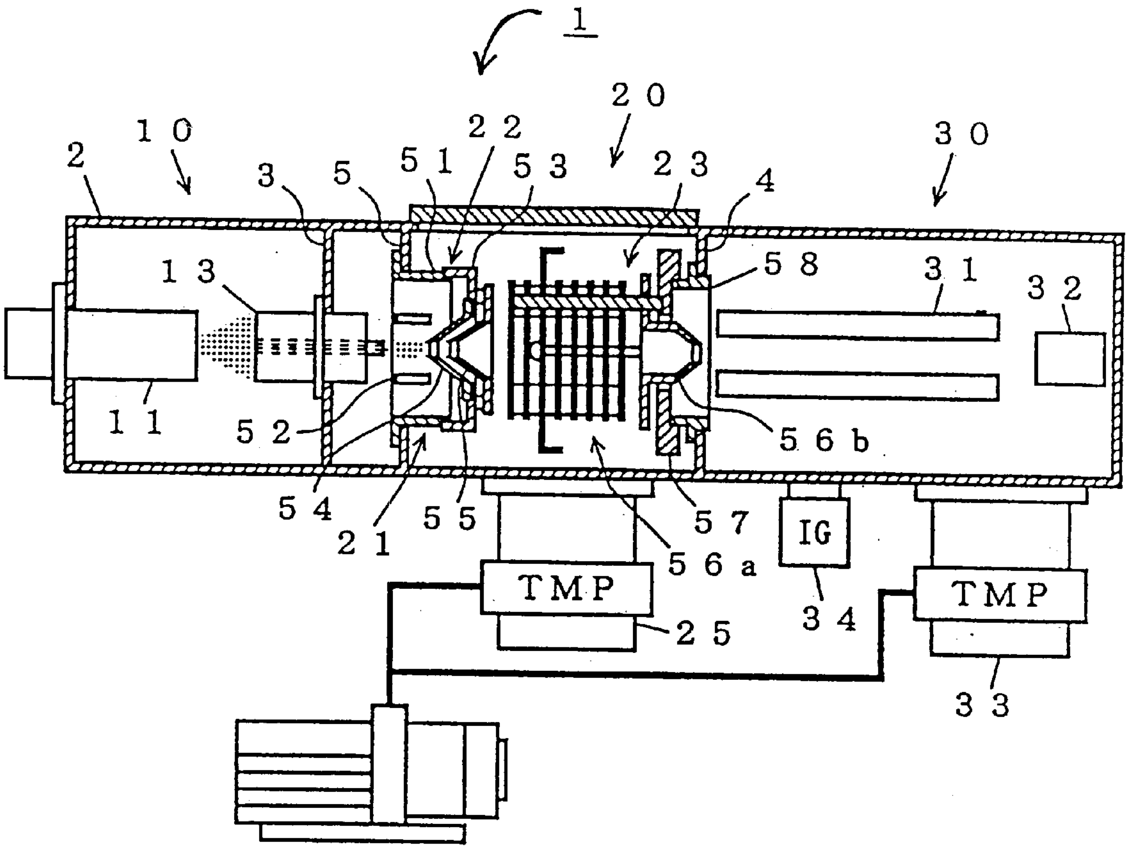
FIG. 1 is a schematic structural diagram of a mass spectrometer embodying this invention.

FIG. 1 shows the general structure of a mass spectrometer 1 embodying this invention. Its main body 2, built in the shape of an ordinary box, includes an ionization part 10, a beam converging part 20 and a detection part 30. The ionization part 10 includes an ionization unit 11 for ionizing, by an atmospheric pressure ionization method, the components contained in a sample gas obtained by gasifying or nebulizing a liquid sample introduced, say, from a liquid chromatograph. The beam converging part 20 includes an ion introducing unit 21, an extraction unit 22 and a lens unit 23. The ion introducing unit 21 is for converging an ion flow and introducing this converged ion flow into the extraction unit 22 where a portion of the ion flow is extracted in the form a beam. The lens unit 23 includes electrodes and serves to generate an ion beam by accelerating the ions thus extracted. These units will be herein summarily referred to as the "lens system". The detection part 30 is provided with a quadrupole 31 for separating ions contained in this ion beam according to their mass numbers, as well as an ion detector 32 for analyzing the ions which have passed through the quadrupole 31 in the direction of the optical axis of the ion beam.

The ionization part 10 is adjacent to the beam converging part 20, separated therefrom by an inner partition wall (herein referred to as the "first partition") 3 provided inside the main body 2. Similarly, the converging part 20 is adjacent to the detection part 30, separated therefrom by another inner partition wall (herein referred to as the "second partition") 4. The first partition 3 is provided with an interface 13 which serves to remove the solvent from the sample gas, and the inner space of the ionization part 10 is communicated with the inner space of the beam converging part 20 through this interface 13. Pumps 25 and 33 (turbo molecular pumps TMP) are provided respectively to the beam converging part 20 and to the detection part 30 for discharging air. Numeral 34 indicates a vacuum gauge (an ion gauge IG) connected to the detection part 30.

Figure 2:
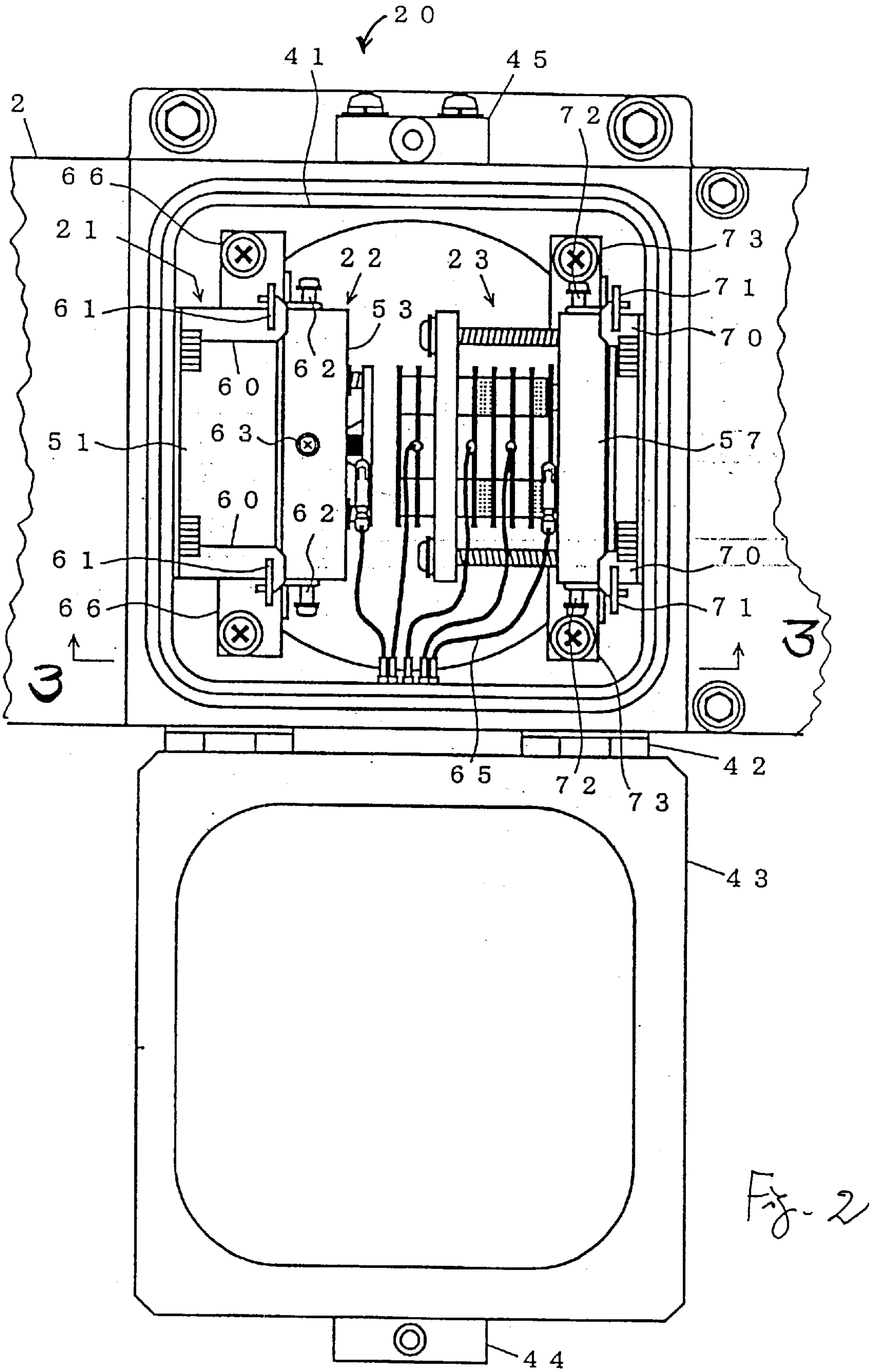
FIG. 2 is a plan view of the beam converging part of the mass spectrometer shown in FIG. 1.

The structure of the beam converging part 20 is described next more in detail with reference to FIGS. 2, 3 and 4.

The beam converging part 20 according to this invention is in part characterized as having an opening 41 for maintenance purposes provided on its upper surface. A door 43 is attached to the main body 2 by means of hinges for closing this opening 41 in an airtight manner. When the door 43 is closed, an attachment part 44 at the tip of the door 43 is fastened to a counterpart attachment part 45 on the main part 2 by means of a bolt or a screw.

The ion introducing unit 21 comprises an approximately cylindrical main structure 51 which penetrates and is affixed to an inner wall 5 inside the beam converging part 20, and a deflector lens 52 for converging ions in a flow is contained inside this main structure 51. The extraction unit 22 is formed by affixing a skimmer 54 and a pullout electrode 55 to a circular base plate 53 in the shape of a cover with an opening at the center for passing ions therethrough. This base plate 53 is detachably attachable to an end part of the main structure 51 of the ion introducing unit 21. The aforementioned lens unit 23 is formed by attaching both a plurality of circular plate electrodes 56*a* each with an opening at the center for passing ions therethrough and an orifice-shaped electrode 56*b* on the downstream side thereof on an circular base plate ("lens-unit holder") 57 in the shape of a cover and having an opening at its center for passing ions therethrough. This circular base board 57 is detachably attached to an end part of an approximately cylindrical member 58 which penetrates and is affixed to the aforementioned second partition 4 as shown in FIGS. 1 and 4.

The beam converging part 20 is provided with a pair of hooks 60 (only one being visible in FIG. 3) each attached to a corresponding side surface of the inner wall 5 and a pair of springs ("forward-biased springs") 61 (only one being visible in FIG. 3) each having a bend in the middle and a lower end attached to a holding member 66 affixed to a lower wall 7. Protrusions 62 are provided on side surfaces of the base plate 53 of the extraction unit 22 for having the springs 61 pressed against. These hooks 60, holding members 66 and protrusions 62 are together referred to as the "spring holder".

Figure 3:
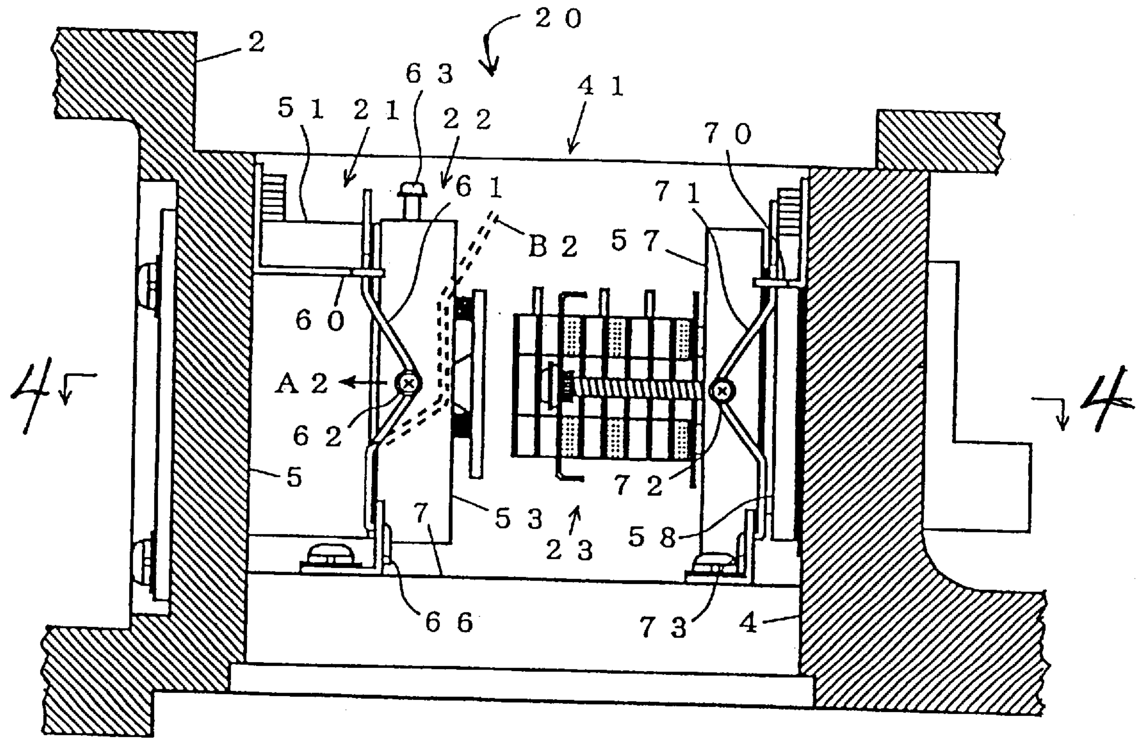
FIG. 3 is a sectional view of the beam converging part of FIG. 2 taken along line 3—3 shown in FIG. 2.
Figure 4:
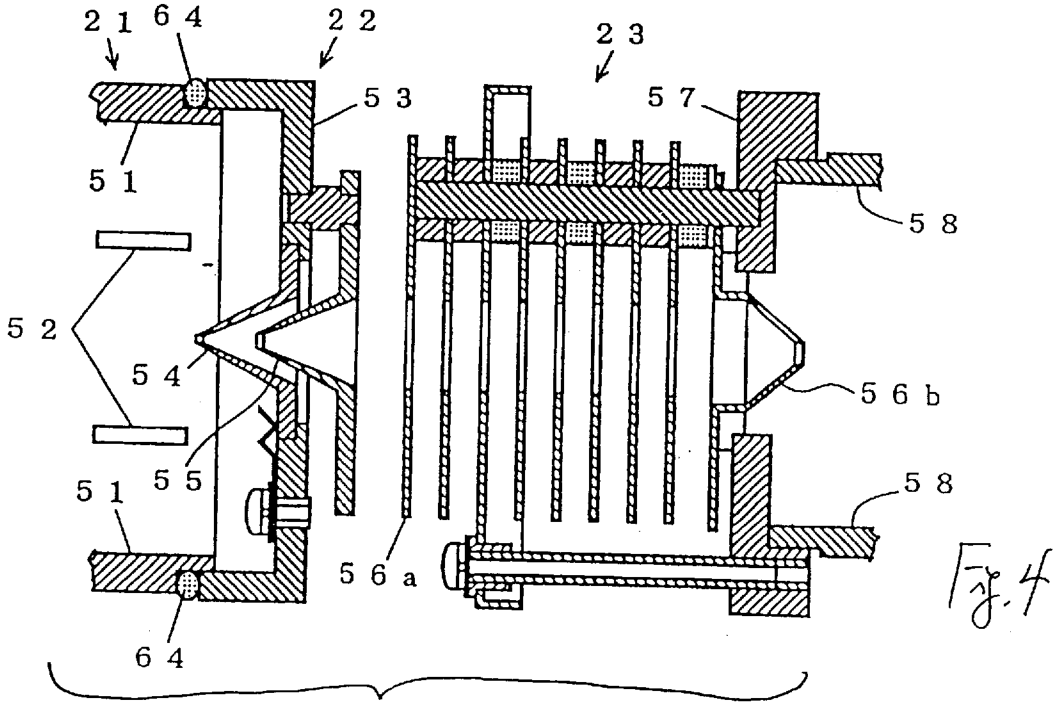
FIG. 4 is a sectional view of the beam converging part of FIG. 2 taken along line 4—4 shown in FIG. 3.

If the upper ends of the springs 61 are hooked by the hooks 60 while the base plate 53 of the extraction unit 22 is attached to the main structure 51 of the ion introducing unit 21, the protrusions 62 on the side surfaces of the base plate 53 are pressed in the direction indicated by arrow A2 in FIG. 3 by the elastic force of the springs 61. The base plate 53 is thereby firmly pressed against the end part of the main structure 51 of the ion introducing unit 21. Since an O-ring 64 is provided at the end part of the main structure 51 of the ion introducing unit 21, the base plate 53 is joined to the end part of the main structure 51 with a high level of airtightness. As a result, a differential wall is completed with the inner wall 5, the main structure 51 of the ion introducing unit 21 and the base plate 53 of the extraction unit 22.

The mechanism for fastening the lens unit 23 is similarly formed. The lens-unit holder 57 is provided with protrusions 72. Hooks 70 are affixed to the aforementioned second partition 4, and springs ("backward-biased springs") 71 each with a bend in the middle have their lower ends affixed to holding members 73 fastened to the lower wall 7. As the upper ends of the springs 71 are hooked by the hooks 70, the planar lens-unit holder 57 for the lens unit 23 is pressed against the end part of the cylindrical member 58 (and therethrough against the second partition 4, thereby completing a differential wall comprising the second partition 4, the cylindrical member 58 and the base plate 57 of the lens unit 57.

When a maintenance work is to be carried out on the beam converging part 20 structured as described above, the door 43 is opened, wires 65 are removed from the electrodes of the extraction unit 22 and the lens unit 23 and the top ends of the springs 61 are disengaged from the hooks 60 as indicated by broken lines B2 in FIG. 3. Thereafter, the base plate 53 of the extraction unit 22 can be easily removed from the end part of the main structure 51 of the ion introducing unit 21. If the user holds a knob 63 provided on the base plate 53 as shown in FIGS. 2 and 3 to lift up the extraction unit 22 out through the opening 41, every component of the extraction unit 22 can be accessed from any direction. The lens unit 23 can also be removed from the cylindrical member 58 in a similar sequence to be removed through the opening 41. It also goes without saying that they can be reset inside the main body 2 in a reverse order after a maintenance routine.

In summary, a maintenance work can be carried out easily on the mass spectrometer 1 embodying this invention because the units comprising the beam converging part 20 can be easily taken out of the main body 2 without the necessity of first removing the ionization part 10 or the detection part 30 but merely by disengaging the top ends of the springs 61 and 71 from the hooks 60 and 70. In reverse, the units comprising the beam converging part 20 can be set inside the main body 2 merely placing these units at their proper positions and then engaging the top ends of the springs 61 and 71 with the hooks 60 and 70.

Although the invention has been described above with reference to only one example, this example is not intended to limit the scope of the invention. Many modifications and variations are possible within the scope of this invention. For example, the door for the maintenance work on the beam converging part need not be provided on the upper surface of the main body. Such a door may very well be provided on a side surface. Instead of a rotary door attached to the main body by hinges, use may be made of a cover to be attached by the likes of bolts to close the opening. Instead of springs with a bend in the middle, springs of other kinds such as coil springs or plate springs may be used to provide an elastically closing mechanism for the door using hooks. It also goes without saying that the application of the present invention is not limited to a mass spectrometer of the so-called differential air discharge type but also to mass spectrometers of other kinds as long as they are of a type having inner partition walls for positioning the units comprising the lens system. In summary, the present invention describes a mechanism for positioning a lens system inside a main body by making use of the elastic force of springs members generated when they are deformed in order to support and position the lens system inside the main body. As a result, the lens system can be easily removed from and installed into the main body.

What is claimed is:

1. A mass spectrometer comprising:

a lens unit for generating an ion beam by converging and accelerating ions obtained by ionizing a sample;

a main body which contains said lens unit in an airtight manner;

a lens-unit holder to which said lens unit is affixed;

springs; and a spring holder affixed to said main body for deforming said springs to cause said lens-unit holder to be pressed against said main body by elastic force of said springs and to thereby position said lens unit at a specified position inside said main body.

2. The mass spectrometer of claim 1 wherein said spring holder includes:

holding members each affixed to one end of a corresponding one of said springs; and hooks each for hooking to the other end of said corresponding one of said springs to thereby cause said lens-unit holder to be pressed against said main body by said elastic force and for unhooking from said other end to thereby release said elastic force with which said lens-unit holder is pressed against said main body.

3. The mass spectrometer of claim 2 wherein each of said springs has a bend between said one end and said other end, wherein said spring holder further includes protrusions from said lens-unit holder and wherein each of said springs presses a corresponding one of said protrusions at the bend against said main body when said corresponding one of said hooks is hooked to said other end.

4. The mass spectrometer of claim 1 wherein said main body has an opening for passing said lens unit therethrough and an airtight cover for closing said opening.

5. The mass spectrometer of claim 1 wherein said main body includes an ionization part, a beam converging part and a detection part, said ionization part containing means for generating ions of a sample, said beam converging part containing said lens unit, said detection part containing means for detecting ions received from said beam converging part, there being a first partition wall between and separating said ionization part and said beam converging part and a second partition wall between and separating said beam converging part and said detection part, said main body having an opening in said beam converging part for passing said lens unit to pass therethrough and a cover for closing said opening.

6. A mass spectrometer comprising:

a lens unit for generating an ion beam by converging and accelerating ions obtained by ionizing a sample;

a main body which contains said lens unit in an airtight manner, said main body including an ionization part, a beam converging part and a detection part, said ionization part containing means for generating ions of a sample, said beam converging part containing said lens unit, said detection part containing means for detecting ions received from said beam converging part, said main body further including a first partition wall between and separating said ionization part and said beam converging part and a second partition wall between and separating said beam converging part and said detection part, said main body having an opening in said beam converging part for passing said lens unit to pass therethrough and a cover for closing said opening;

a lens-unit holder to which said lens unit is affixed;

a base plate with a hole for passing ions therethrough to said lens unit;

forward-biased springs;

backward-biased springs; and spring holders affixed to said main body for deforming said forward-biased springs to cause said base plate to be elastically pressed against said first partition wall and said backward-biased springs to cause said lens-unit holder to be pressed against said second partition wall to thereby position said lens unit and said base plate at specified positions inside said main body.

* * * * *